(12) United States Patent
Estachy

(10) Patent No.: US 10,688,414 B2
(45) Date of Patent: Jun. 23, 2020

(54) FILTERING UNIT WITH AUTOMATIC BACKWASHING

(71) Applicants: ALFA LAVAL CORPORATE AB, Lund (SE); ALFA LAVAL MOATTI SAS, Elancourt (FR)

(72) Inventor: Guillaume Estachy, Meudon (FR)

(73) Assignees: ALFA LAVAL CORPORATE AB, Lund (SE); ALFA LAVAL MOATTI SAS, Elancourt (FR)

(*) Notice: Subject to any disclaimer, the term of this patent is extended or adjusted under 35 U.S.C. 154(b) by 0 days.

(21) Appl. No.: 16/099,394

(22) PCT Filed: May 22, 2017

(86) PCT No.: PCT/EP2017/062236
§ 371 (c)(1),
(2) Date: Nov. 6, 2018

(87) PCT Pub. No.: WO2017/211577
PCT Pub. Date: Dec. 14, 2017

(65) Prior Publication Data
US 2019/0209950 A1 Jul. 11, 2019

(30) Foreign Application Priority Data
Jun. 10, 2016 (EP) .................... 16305705

(51) Int. Cl.
*B01D 25/32* (2006.01)
*B01D 29/50* (2006.01)
(Continued)

(52) U.S. Cl.
CPC .......... *B01D 25/327* (2013.01); *B01D 25/26* (2013.01); *B01D 29/50* (2013.01); *B01D 29/682* (2013.01)

(58) Field of Classification Search
CPC .... B01D 25/327; B01D 29/68; B01D 29/682; B01D 35/16; B01D 35/22; B01D 2201/081
See application file for complete search history.

(56) References Cited

U.S. PATENT DOCUMENTS 2,692,686 A 10/1954 Fleck et al.
3,380,591 A 4/1968 Muller
(Continued)

FOREIGN PATENT DOCUMENTS

CH     386 989     1/1965
EP     3 199 219 A1     8/2017
(Continued)

OTHER PUBLICATIONS

Russian Office Action and Search Report dated Sep. 19, 2019 for Application No. 2019100025/05, along with an English translation of the Office Action.
(Continued)

*Primary Examiner* — Benjamin M Kurtz
(74) *Attorney, Agent, or Firm* — Birch, Stewart, Kolasch & Birch, LLP

(57) ABSTRACT

A filtering unit includes a filtering component having inner and outer walls arranged around each other so as to define an inner space between the inner wall and the outer wall, a filtering mesh partitioning the inner space into a pre-filter chamber and a post-filter chamber, at least said pre-filter chamber being circumferentially compartmented in sectors, a divider arranged coaxially with the filtering component and having distinct distribution columns, and a rotary backwashing distributor having a shutter provided with a discharge opening, the rotary backwashing distributor being mounted to rotate so that said discharge opening is periodically and selectively put into communication with each distribution column, whereby each distribution column peri- (Continued)

odically and selectively establishes communication between the discharge opening and respective ones of the sectors. The rotary backwashing distributor is in direct contact with the divider.

20 Claims, 12 Drawing Sheets

(51) Int. Cl.
*B01D 25/26* (2006.01)
*B01D 29/68* (2006.01)

(56) References Cited

U.S. PATENT DOCUMENTS

| | | | | |
|---|---|---|---|---|
| 3,734,299 | A * | 5/1973 | Akiyama | B01D 29/15 210/333.1 |
| 4,636,311 | A | 1/1987 | Litzenburger | |
| 6,060,327 | A | 5/2000 | Keen | |
| 9,138,666 | B2 | 9/2015 | Chrupalla | |
| 2013/0161252 | A1* | 6/2013 | Chrupalla | B01D 25/26 210/411 |

FOREIGN PATENT DOCUMENTS

| | | |
|---|---|---|
| FR | 2 902 024 A1 | 12/2007 |
| GB | 760915 | 11/1956 |
| GB | 1 481 501 | 8/1977 |
| JP | 2002-514305 A | 5/2002 |
| JP | 2013-538681 A | 10/2013 |
| JP | 2014-4571 A | 1/2014 |
| JP | 2014-36915 A | 2/2014 |
| RU | 54 810 U1 | 7/2006 |
| RU | 2 537 007 C2 | 12/2014 |
| SU | 110 134 A1 | 6/1958 |
| WO | WO 2012/028824 A1 | 3/2012 |

OTHER PUBLICATIONS

International Search Report, issued in PCT/EP2017/062236, dated Jul. 21, 2017.
Written Opinion of the International Searching Authority, issued in PCT/EP2017/062236, dated Jul. 21, 2017.

* cited by examiner

FILTERING UNIT WITH AUTOMATIC BACKWASHING

TECHNICAL FIELD

The invention relates to a filtering unit. More particularly, the invention relates to the arrangement of means for automatically backwashing a filtering mesh thereof.

TECHNOLOGICAL BACKGROUND

The international application WO 2012/028824 describes a filtering unit comprising at least two filter elements, each filter element having an internal face, an external face, a filtering mesh, two concentric circular edges, respectively an inner edge and an outer edge between which said filtering mesh extends, and radial ribs provided at least on the internal face, said radial ribs extending between said concentric edges and being distributed circumferentially in order to form distinct sectors on said internal face. Said filter elements are configured to be assembled against each other so that their respective internal faces face each other so as to define a space between them, wherein said radial ribs delimiting the sectors form circumferential compartments in said space. At least one of said inner edge and outer edge has passages respectively communicating with corresponding ones of the sectors. The filter elements are stacked along an axial direction between a first cover and a second cover.

By stacking a selected number of filter element pairs, a desired filter area is obtained for an intended application. Typically, the fluid for filtering penetrates into the stack via passages of the inner edge, passes through the filtering mesh, and, once purified, exits via other passages defined in the outer edge. Naturally, the flow of fluid through the filtering mesh could be reversed or arranged in some other way.

The filter described in that publication further comprises a divider arranged coaxially with the filter elements, the divider having distinct distribution columns, and a rotary backwashing distributor provided at the first cover. The rotary backwashing distributor has a shutter provided with a discharge opening and is mounted to rotate so that said discharge opening is periodically and selectively put into communication with each distribution column, whereby each distribution column periodically and selectively establishes communication between the discharge opening and respective ones of the passages.

In this way, periodically, the fluid flow is reversed in the sectors corresponding to passages in fluid communication with the discharge opening, which enables backwashing to be performed in these sectors due to the pressure gradient across the filtering mesh, i.e. the pressure gradient between the external face side and the internal face side. The fluid used for backwashing is then discharged through the discharge opening.

This filtering unit of the prior art comprises a distribution spacer forming part of the first cover. This distribution spacer has passages extending said distribution columns and the shutter is in sealing and sliding contact with an annular surface of the distribution spacer into which said passages open out. Furthermore, a distributor supporting structure, including a support having arms, is mounted on the first cover.

Now, a need has arisen for an improved distribution arrangement. One such need is the requirement for smaller filters. Therefore, there is a need for a new type of filtering units.

SUMMARY OF THE INVENTION

This problem is solved by a filtering unit according to the independent claim. In an aspect thereof, the present disclosure relates to a filtering unit comprising: a filtering component having an inner wall, an outer wall arranged around the inner wall so as to define an inner space between the inner wall and the outer wall, and a filtering mesh partitioning the inner space into a pre-filter chamber and a post-filter chamber, at least said pre-filter chamber being circumferentially compartmented in sectors, at least one of said inner wall and outer wall having passages respectively communicating with corresponding ones of the sectors, a divider arranged coaxially with the filter component, the divider having distinct distribution columns, and a rotary backwashing distributor having a shutter provided with a discharge opening, the rotary backwashing distributor being mounted to rotate so that said discharge opening is periodically and selectively put into communication with each distribution column, whereby each distribution column periodically and selectively establishes communication between the discharge opening and respective ones of the passages. Furthermore, the rotary backwashing distributor is in direct contact with the divider.

The pre-filter chamber is the part of the inner space wherein fluid to be filtered flows. The fluid then crosses the filtering mesh, is thereby filtered, and enters the post-filter chamber. The pre-filter chamber and the post-filter chamber are on either sides of the filtering mesh.

The rotary backwashing distributor is rotatable with respect to the divider. Thus, if the distribution columns of the divider are arranged along a circumference or equivalent, the discharge opening can easily be put in fluid communication with the distribution columns in a sequential and periodic manner.

In the above-described filtering unit, since the rotary backwashing distributor is in direct contact with the divider, a distribution spacer provided with passages extending the distribution columns is no longer required and the filtering unit is therefore easier and cheaper to produce.

In some embodiments, the above-mentioned filtering component is embodied by at least two filter elements stacked along an axial direction, each filter element having an internal face, an external face, a filtering mesh, two concentric edges, respectively an inner edge and an outer edge between which said filtering mesh extends, and radial ribs provided at least on the internal face, said radial ribs extending between said concentric edges and being distributed circumferentially in order to form sectors on said internal face, said filter elements being configured to be assembled against each other so that their respective internal faces face each other so as to define a space between them, wherein said radial ribs delimiting the sectors form circumferential compartments in said space, at least one of said inner edge and outer edge having passages respectively communicating with corresponding ones of the sectors. The radial ribs of the filter elements may be regularly or non-regularly distributed circumferentially.

In these embodiments, the filter component comprises the stack of filter elements. The stacked inner edges form the inner wall and the stacked outer edges form the outer wall. As will be explained later, the pre-filter chamber may be formed by a plurality of pre-filter chamber portions fluidly communicating with one another without crossing the filtering mesh. The post-filter chamber may be formed by a plurality of post-filter chamber portions fluidly communicating with one another without crossing the filtering mesh.

In some embodiments, the filtering unit comprises a drive rod extending axially through the divider, the drive rod having a first end portion rotationally fixed to the distributor and a second end portion configured to be driven in rotation. Thus, the drive rod is configured to transmit a drive torque to the distributor. The drive rod enables to position a drive power source for rotating the distributor in a location remote from that of the rotary backwashing distributor.

Alternatively, the distributor and the drive power source may be provided at the same side of the filtering component. Then, the driving rod extending through the divider may of course be omitted.

In some embodiments, the filtering unit further comprises biasing means cooperating with the drive rod so as to force the distributor and the divider against each other, e.g. force or urge the distributor against the divider. Thus, sealing contact between the distributor and the divider is ensured.

Owing to this structure, a distributor supporting structure is no longer required. This results in cheaper and easier manufacturing of the filtering unit. Moreover, the overall filtering unit length is reduced, which is advantageous not only for limited space applications, such as in a marine environment, but also for decreasing the pressure drop across the filtering unit. This results in an improved flow capacity and reduced energy consumption.

In some embodiments, the drive rod is axially fixed with respect to the divider and the biasing means are mounted between the drive rod and the distributor. The drive rod may be fixed to the divider in a rotatable manner. The drive rod may be axially fixed to a third part, in a rotatable manner, the third part being in turn fixed to the divider. The biasing means may be mounted at the first end portion of the drive rod such that the distributor is arranged between the biasing means and the divider, forcing the distributor against the divider.

In some embodiments, the biasing means are mounted between the drive rod and the divider. The biasing means may be mounted at the second end portion of the drive rod, forcing the second end portion away from the divider and the first end portion towards the divider. The biasing means may be mounted between the drive rod and a third part which is fixed to the divider. The drive rod may be axially fixed to the rotary backwashing distributor, thereby forcing the distributor against the divider.

In some embodiments, the shutter of the rotary backwashing distributor is in direct contact with the divider. To avoid leakage, the shutter may be in sealing and sliding contact with the divider. The sealing contact may be a metal-metal type seal, i.e. a metal part of the shutter is in a sealing contact with a metal part of the divider. It should also be noted that the contacting portions of the may be non-metal parts of the divider, the distributor, or both.

In some embodiments, the filtering unit comprises a first cover and a second cover located at either sides of the filter component in the axial direction, wherein the first cover has an annular shoulder having an internal surface defining an axial opening and the shutter is in contact with the divider through the axial opening.

The annular shoulder of the first cover may be an inner annular shoulder, whereby the axial opening may be a central opening. In these embodiments, the first cover may be annular.

A portion of the drive rod may be rotatably connected to the second cover, e.g. via a bearing.

In some embodiments, an inner diameter of the shoulder of the first cover is equal to or greater than an outer diameter of the divider. Accordingly, the divider may then be at least partially arranged in the axial opening of the first cover. Thus, the distribution columns extend beyond the stacked filter elements. Sealing of the distribution columns is thus easily obtained, e.g. at the interface between the divider and the first cover.

In some embodiments, the divider and the second cover are rigidly attached to each other. Since the distribution plate of the prior art solution can be omitted, the relative axial positions of the first cover and the divider can vary to match the length of the filtering component (stack of filter elements). Thanks to this adjustment, the relative axial positions of the second cover and the divider can be made fixed. Consequently, the divider and the second cover can be rigidly attached to each other, possibly even as a single unit made of a single piece, thereby increasing their sealing properties and facilitating assembly of the filtering unit.

In some embodiments, the rotary backwashing distributor comprises an engagement portion for engagement with a corresponding engagement portion of the divider. The respective engagement portions of the rotary backwashing distributor and the divider are in engagement with each other so as to radially position the rotary backwashing distributor with respect to the divider. The engagement portions may be tubular. For instance, one of these tubular portions may be a sleeve portion fitted on the other tubular portion.

The function of the engagement portion of the rotary backwashing distributor is distinct from that of the shutter. While the engagement portion is configured for engagement with the engagement portion of the divider, the shutter is configured to periodically and selectively shut the distribution columns from incoming fluid to be filtered. The respective engagement portions of the rotary backwashing distributor and the divider define an axis, around which said shutter of the rotary backwashing distributor is rotatably mounted with respect to the divider.

In some embodiments, the divider is made of a single piece. In these embodiments, the divider is a single integral part devoid of inner interfaces. This improves sealing between adjacent distribution columns.

The divider may be produced by extrusion, thus any desired length can be easily obtained, in particular for a single-piece divider. However, it should be noted that the divider can be manufactured using any of a number of manufacturing methods, including but not limited to molding, machining, 3D-printing, metal sheet pressing, etc.

The present disclosure also relates to a filter comprising a filtering unit as previously described.

The present disclosure also relates to a filter comprising a main filtering unit as previously described and an auxiliary filtering unit as previously described, wherein the auxiliary filtering unit is arranged to receive backwash fluid used for backwashing the main filtering unit. Thus, the backwash fluid can be filtered before flowing out of the filter, which may eliminate the need for or at least facilitate fluid treatment downstream of the filter.

BRIEF DESCRIPTION OF THE DRAWINGS

The invention and advantages thereof will be better understood upon reading the detailed description which follows, of embodiments of the invention given as non-limiting examples. This description refers to the appended drawings, wherein.

DETAILED DESCRIPTION OF EMBODIMENTS

Figure 1:
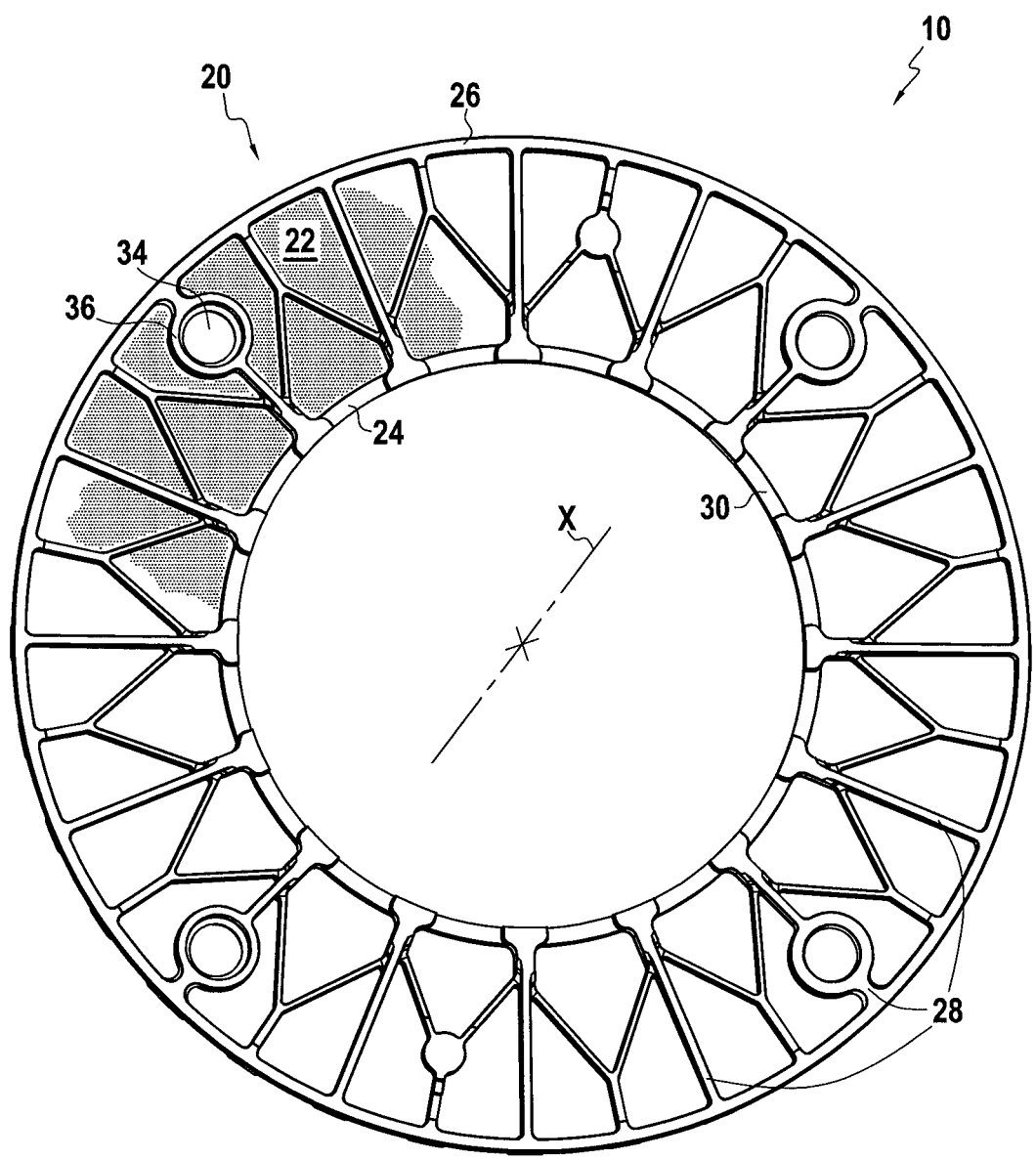
FIG. 1 illustrates a perspective view of a filter element according to an embodiment.
Figure 2:
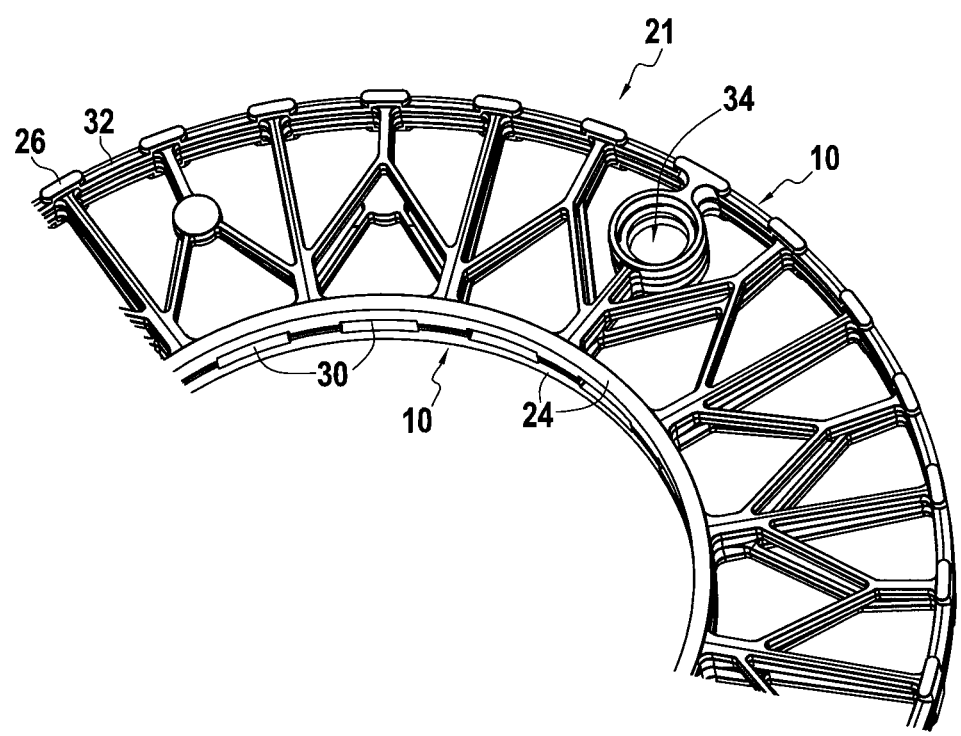
FIG. 2 is a partial perspective view of two filter elements stacked one on the other.

A filter element 10 according to an embodiment represented in FIGS. 1 and 2 is described below. Such a filter element is described in more details in European patent application No. 16 305 082.6. However, the filtering unit according to the invention could be implemented with other filter elements.

The filter element 10 has an internal face 20, an external face 21, a filtering mesh 22, two concentric circular edges, respectively an inner edge 24 and an outer edge 26 between which said filtering mesh 22 extends. The concentric circular edges 24, 26 are circular about a central axis X, hereafter referred to as defining an axial direction. The inner edge 24 mainly extends in a plane which is perpendicular to the axial direction X, i.e. a radial plane. The outer edge 26 mainly extends in a plane which is perpendicular to the axial direction X, i.e. a radial plane.

The filter element 10 comprises radial ribs 28 provided at least on the internal face 20. In this embodiment, as shown in FIG. 2, radial ribs 28 are provided on the external face 21 too. Thus, if three similar filter elements 10 are stacked, both faces of the filter element in the middle of the stack face the respective internal and external faces of the two other filter elements, and the radial ribs provided on these respective faces interact to form compartments.

The radial ribs 28 extend between the inner edge 24 and the outer edge 26, in the radial direction. The radial ribs 28 are distributed circumferentially in order to form sectors on said internal face 20, as shown in FIG. 1, and on said external face 21. In this embodiment, the radial ribs 28 are regularly distributed circumferentially. The radial ribs 28 on the internal face 20 and on the external face 21 face one another on opposite sides of the filtering mesh 22. In other words, the radial ribs 28 on the internal face 20 and on the external face 21 are in axial correspondence with one another.

The inner edge 24 has passages 30 respectively communicating with corresponding sectors. The passages 30 are provided as notches or cutouts in the inner edge 24. The passages 30 are provided between consecutive radial ribs 28. The passages 30 are provided on the internal face 20.

As shown in FIG. 2, the outer edge 26 has passages 32 respectively communicating with corresponding ones of the sectors. The passages 32 are provided as notches or cutouts in the outer edge 26. The passages 32 are provided between consecutive radial ribs 28. The passages 32 are provided on the external face 20.

Holes 34 for passing assembly rods 34a, typically threaded rods, are defined in the vicinity of the outer edge 26 of each filter element, and they are formed by molding the same material that defines the circular edges 24, 26 and the radial ribs 28. Male and female bushings 36 are arranged around these holes 34, e.g. in a radial rib 28, for indexing two filter elements 10 relative to each other.

In the non-limiting example shown, each filter element 10 is divided into sixteen sectors and has four holes 34 with bushings regularly spaced apart circumferentially. Depending in particular on its diametrical size, the filter element can have less or more sectors. For example, a filter element having a smaller outer diameter may have a smaller number of sectors, and a filter element having a larger outer diameter may have a larger number of sectors.

For instance, liquid to be filtered, e.g. oil or water, can enter the stack of filter elements 10 shown in FIG. 2 through a passage 30 of the inner edge 24 of a filter element 10, flow through the filtering mesh 22 to pass from the internal face 20 to the external face 21, whereby the liquid is filtered, and flow out of the filter element 10 through a passage 32 of the outer edge 26. The opposite flow direction is possible as well.

As illustrated in FIG. 2, the filter elements 10 are configured to be assembled against each other so that their respective internal faces 20 face each other so as to define a space between them. Said space is circumferentially compartmented by the contacting radial ribs 28 of said internal faces. On the other hand, the radial ribs 28 provided on the external face 21 do not have to contact one another. Compartmenting sectors on the side of the filtering mesh 22 on which non-filtered liquid is introduced enables de-clogging the filtering mesh 22 by backwashing, as will be explained hereafter.

Figure 3:
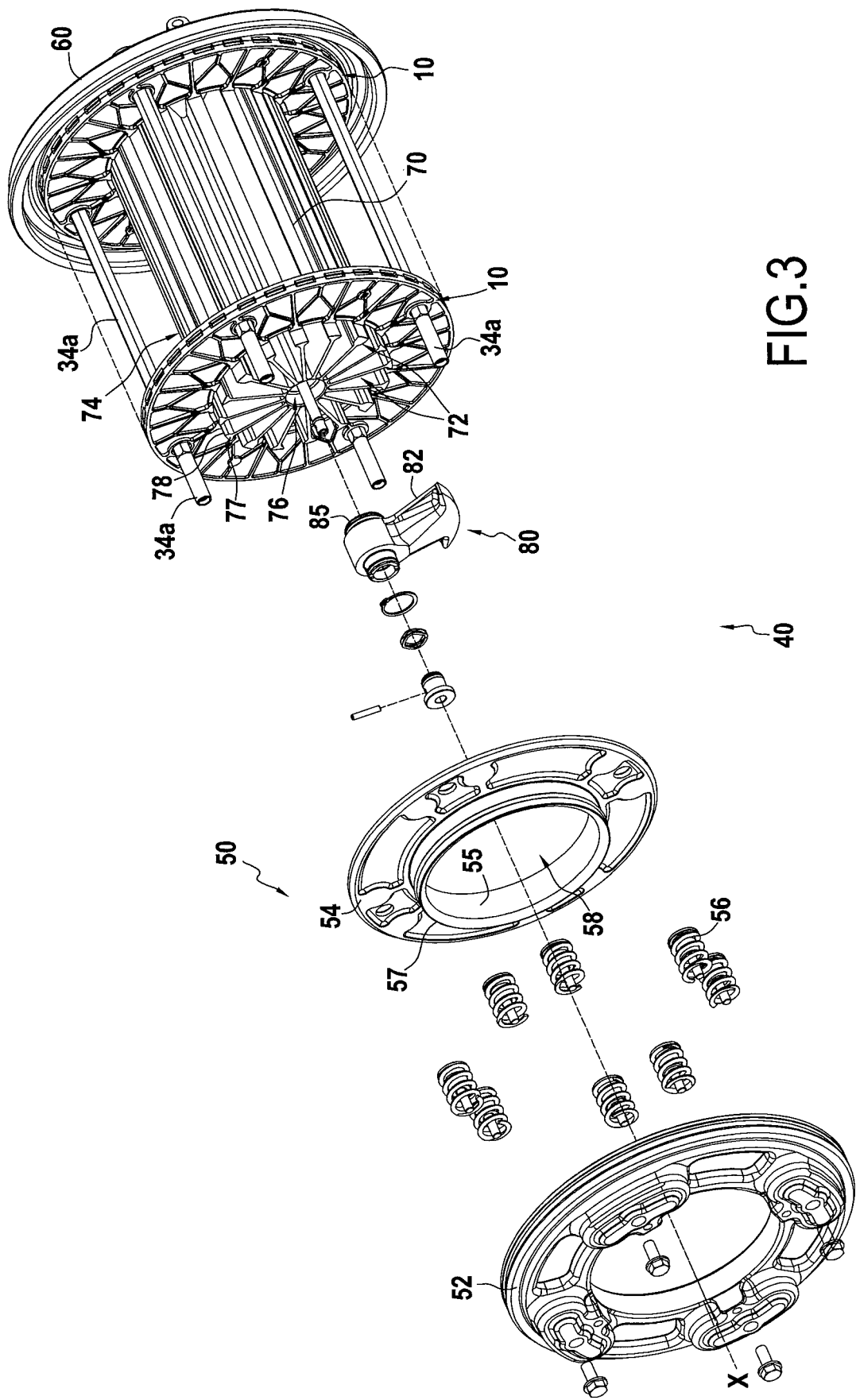
FIG. 3 is an exploded perspective view of selected parts of a filtering unit according to an embodiment.
Figure 4:
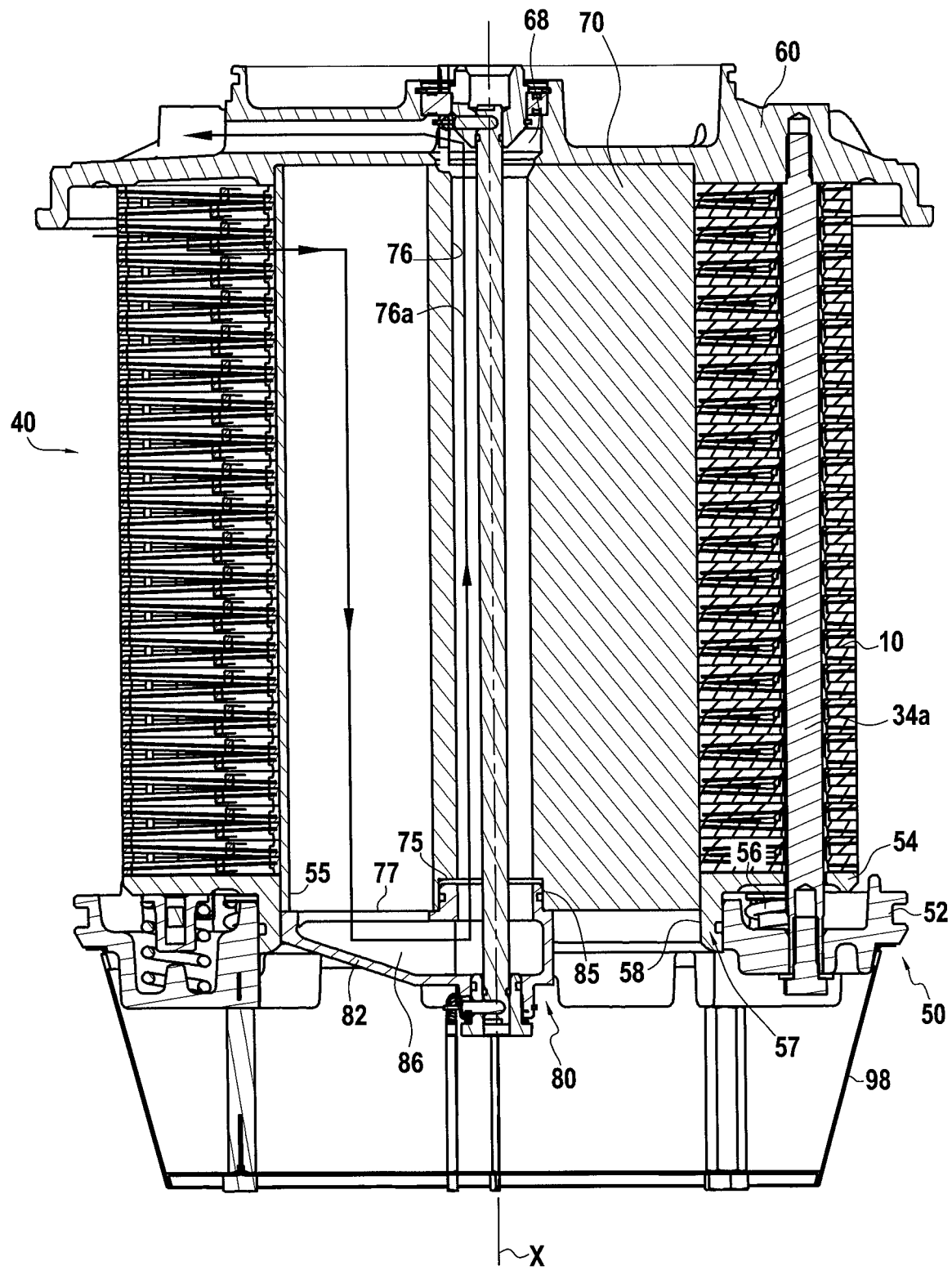
FIG. 4 is a section view of a filtering unit according to the embodiment of FIG. 3 in the half-planes IV-V of FIG. 8.

As can be seen in FIGS. 3 and 4, which show selected parts of a filtering unit 40 according to an embodiment of the invention, the pairs of filter elements 10 are stacked along the axial direction. In this embodiment, the filter elements 10 are stacked between a first cover 50 and a second cover 60.

The stack of filter elements 10 forms a filtering component. The spaces between the respective internal faces 20, which are circumferentially compartmented by the radial ribs 28 so as to form sectors, respectively form pre-filter chamber portions. The pre-filter chamber portions fluidly communicate with one another via the passages 30, thus forming a pre-filter chamber. On the other side of the filtering mesh 22, the spaces between the respective external faces 21 form post-filter chamber portions. The post-filter chamber portions fluidly communicate with one another via the passages 32, thus forming a post-filter chamber.

A divider 70 is arranged coaxially with the filter component, namely with the filter elements 10. In this embodiment, the divider 70 is arranged inside the cylindrical space defined by the set of inner edges 24 of all of the filter elements 10. The divider 70 has distinct distribution columns 72. In this embodiment, the divider 70 co-operates with the stack of filter elements 10 to define a set of sixteen distribution columns 72, i.e. the same number of columns as the number of sectors defined in the filter elements 10. Other embodiments are also contemplated, in which the number of columns and sectors do not coincide. In particular, the number of columns may be less than the number of sectors, such that a single column may simultaneously communicate with a plurality of sectors.

According to the example illustrated in FIG. 3, the divider 70 has plane fins 74 that are regularly distributed circumferentially and that extend in planes containing the common axial direction X of all of the filter elements 10. More precisely, the fins 74 are attached to an axial cylindrical core 76 and the edges 78 of the fins 74 are in contact with the respective inner edges 24 of the stacked filter elements 10.

Each distribution column 72 is thus defined between two adjacent fins 74 and a portion of the internal cylindrical surface of the stack. Each distribution column 72 communicates with the passages 30 of the inner edges 24 of the internal faces 20 of the filter elements 10 extending along a common direction parallel to the axial direction X. These passages 30 constitute all of the inlets of the individual filter elements 10 in the stack that correspond to a given angular sector of the filtering unit and that can be isolated in order to be subjected to a backwashing operation by reversing the flow direction of the filtered liquid.

The divider 70 described in this embodiment has a constant axial cross-section and can, thus, advantageously be manufactured by extrusion. In this embodiment, the divider 70 is made of a single piece.

The divider may be made of a number of different materials, including metal, plastic or ceramic materials, or combinations thereof.

Further structural details about the divider 70 may be found in the published application WO 2012/028824. The present invention may also be implemented with any other suitable type of divider, including but not limited to the type represented in FIG. 11 of the published application WO 2012/028824.

Figure 7:
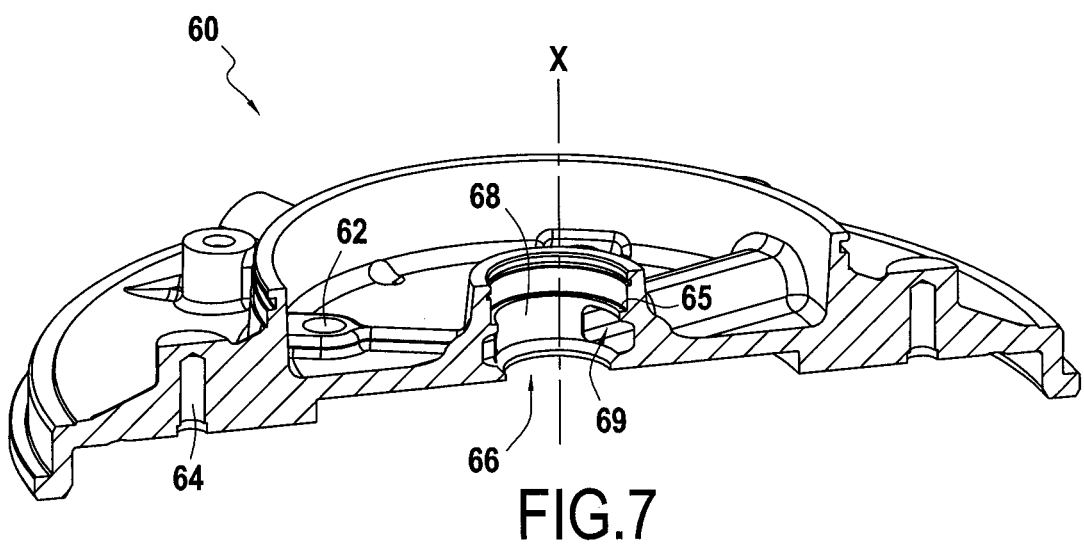
FIG. 7 is a cut perspective view of a second cover according to the embodiment of FIG. 3 in the plane IV of FIG. 8.
Figure 8:
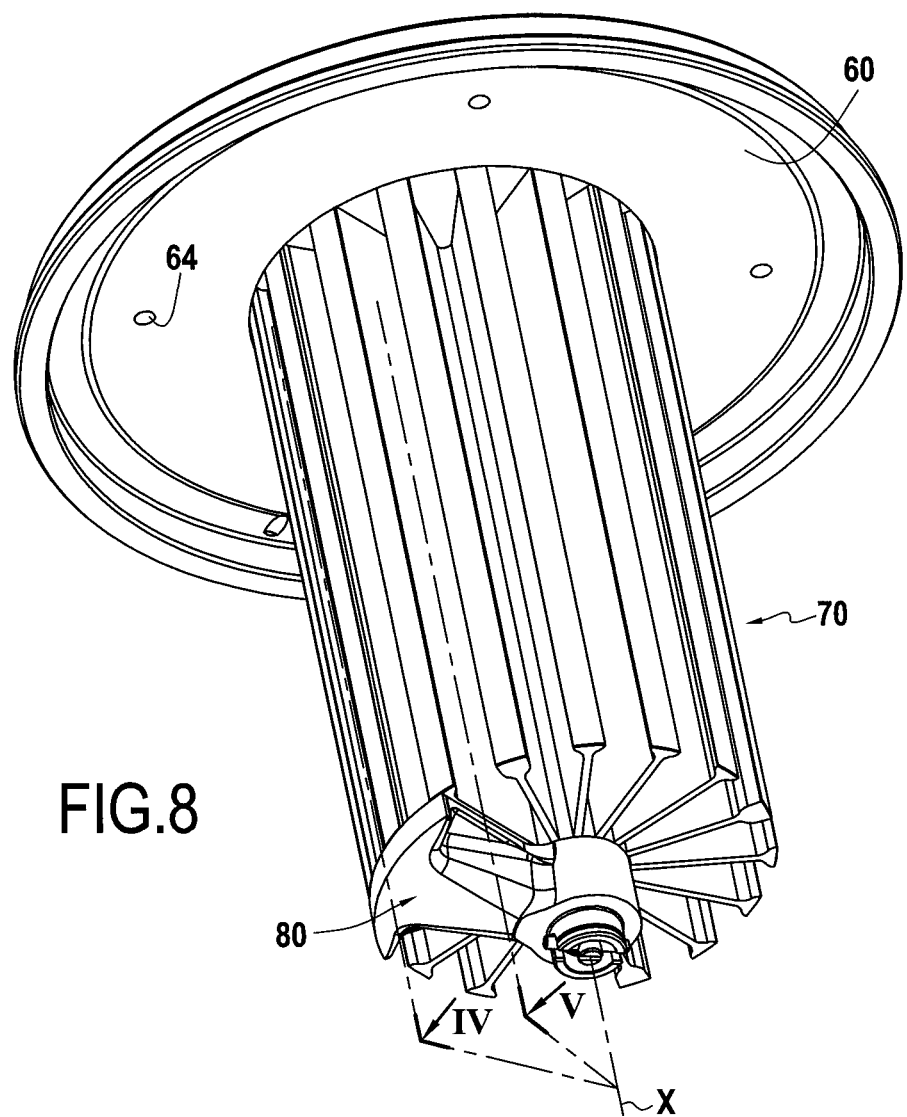
FIG. 8 is a perspective view of a second cover and a divider.

As shown in FIG. 7, the second cover 60 has holes 62 for passing screws that, on assembly, are positioned in register with corresponding tapped blind holes arranged at the ends of some of the fins 74. In this way, the divider 70 is fastened by screws to the internal face of the second cover 60, thereby putting the inter-fin spaces and thus the distribution columns 72 into correspondence with the corresponding passages 30. As illustrated in FIG. 8, the divider 70 and the second cover 60 may be rigidly attached. Holes 64 for accommodating the assembly rods 34a may be provided so as to put the distribution columns 72 into correspondence with the corresponding passages 30. The second cover 60 has an axial opening 66 in register with the cylindrical core 76 of the divider 70. This axial opening opens out in a transfer chamber 68, which transfer chamber 68 is in communication with the side of the second cover 60 opposite the divider 70, via lateral ducts 69. The lateral ducts 69 provide an isolated path for backwash liquid.

Back to FIGS. 3 and 4, the first cover 50 is a generally annular part. In this embodiment, the first cover 50 comprises a main body 52 and a retaining plate 54. The main body 52 and the retaining plate 54 are assembled together coaxially. The first cover 50 comprises biasing means 56, e.g. springs, mounted so as to force the retaining plate 54 against the stack of filter elements 10 and ensure that adjacent filter elements 10 are tightly pressed against one another between the retaining plate 54 of the first cover 50 and the second cover 60. The main body 52 of the first cover 50 is mounted at a fixed distance from the second cover 60, here by fastening to the assembly rods 34a.

As explained previously, the first cover 50 has a shoulder 57 having an inner surface 55 defining an axial opening 58. Namely, the retaining plate 54 has an inner shoulder 57 protruding towards the main body 52. In this embodiment, an inner diameter of the first cover 50, here an inner diameter of the inner shoulder 57, is equal to or greater than an outer diameter of the divider 70. The diameters are measured in radial planes. More precisely, the radially outer edges 78 of the fins 74 are in contact with the inner shoulder 57 of the retaining plate 54, so that each distribution column 72 is further defined between two adjacent fins 74 and a portion of the retaining plate 54, i.e. between the divider 70 and a portion of the first cover 50.

Figure 5:
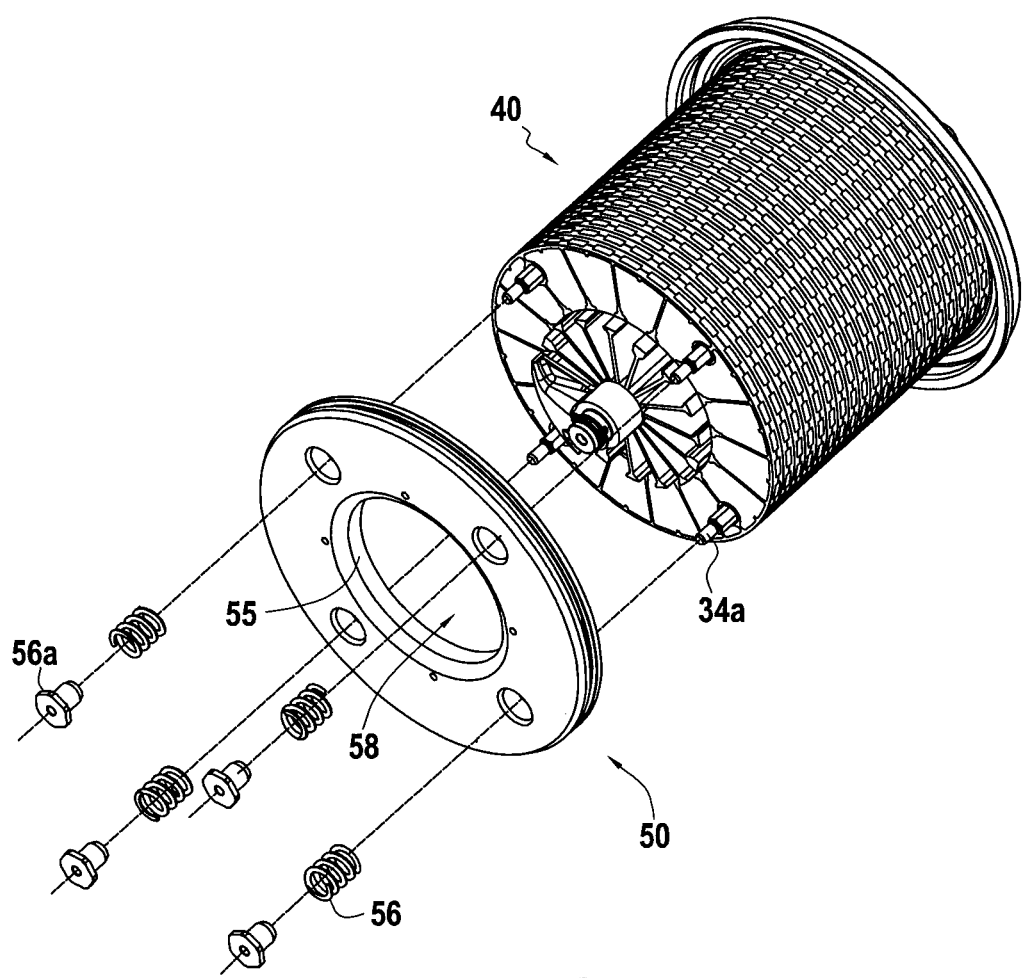
FIG. 5 is an exploded perspective view of selected parts of a filtering unit according to another embodiment.
Figure 6:
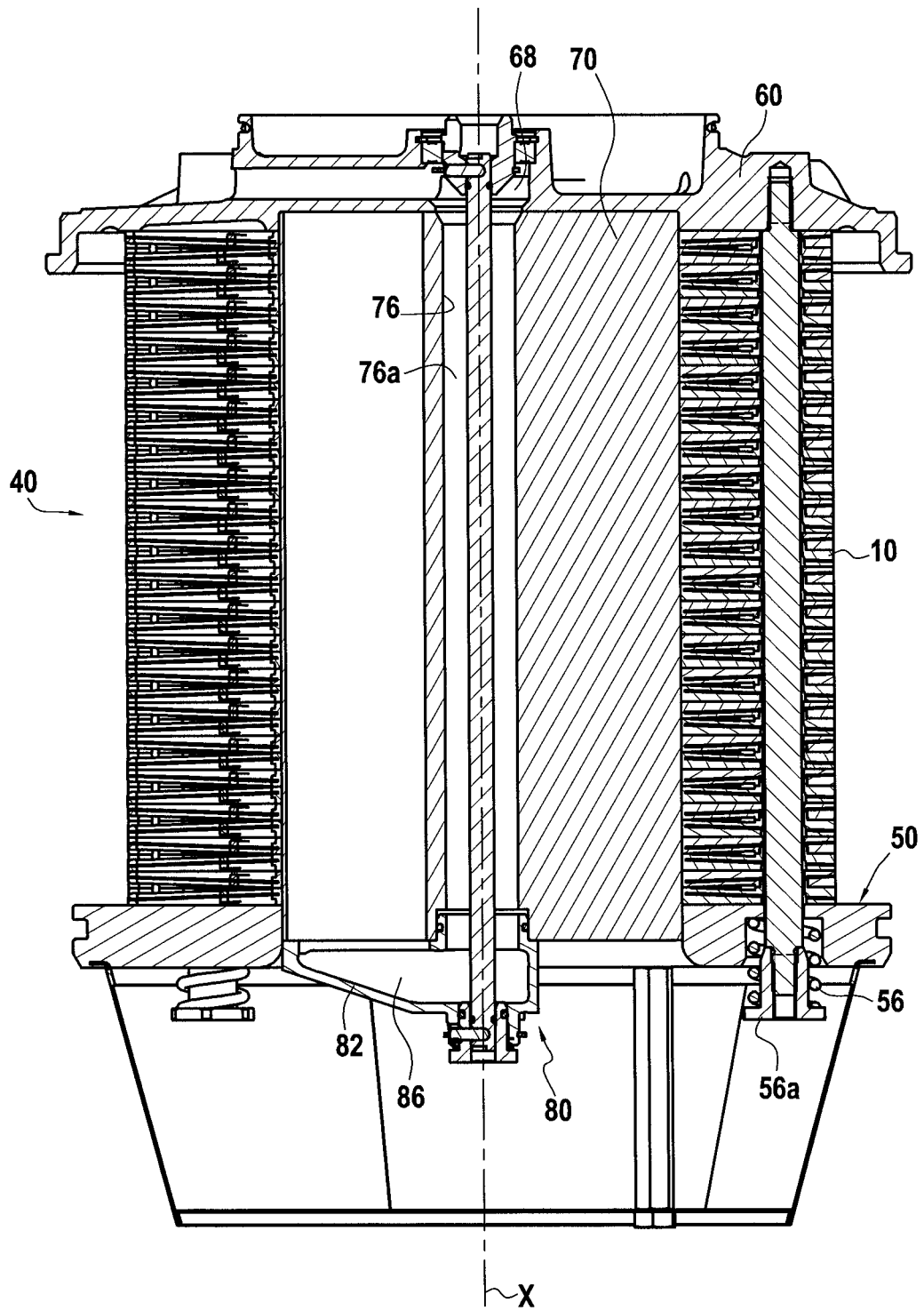
FIG. 6 is a section view of a filtering unit according to the embodiment of FIG. 5 in the half-planes IV-V of FIG. 8.

FIGS. 5 and 6 show a filtering unit 40 according to another embodiment. Features identical or similar to the embodiment of FIGS. 3 and 4 have the same reference sign and their description is omitted.

As shown in FIGS. 5 and 6, instead of comprising a main body 52 and a retaining plate 54, the first cover 50 according to this embodiment is made of a single piece or an integral body. Biasing means 56, e.g. springs, are mounted so as to force the first cover 50 against the stack of filter elements 10 and ensure that adjacent filter elements 10 are tightly pressed against one another between the first cover 50 and the second cover 60. Thus, the first cover 50 is mounted at a varying distance from the second cover 60, depending on the axial length of the stack of filter elements 10. The springs 56 are supported on fixed shoulders, here shoulders of sleeves 56a fastened to the assembly rods 34a.

Other embodiments of the first cover 50 are also contemplated.

Figure 10:
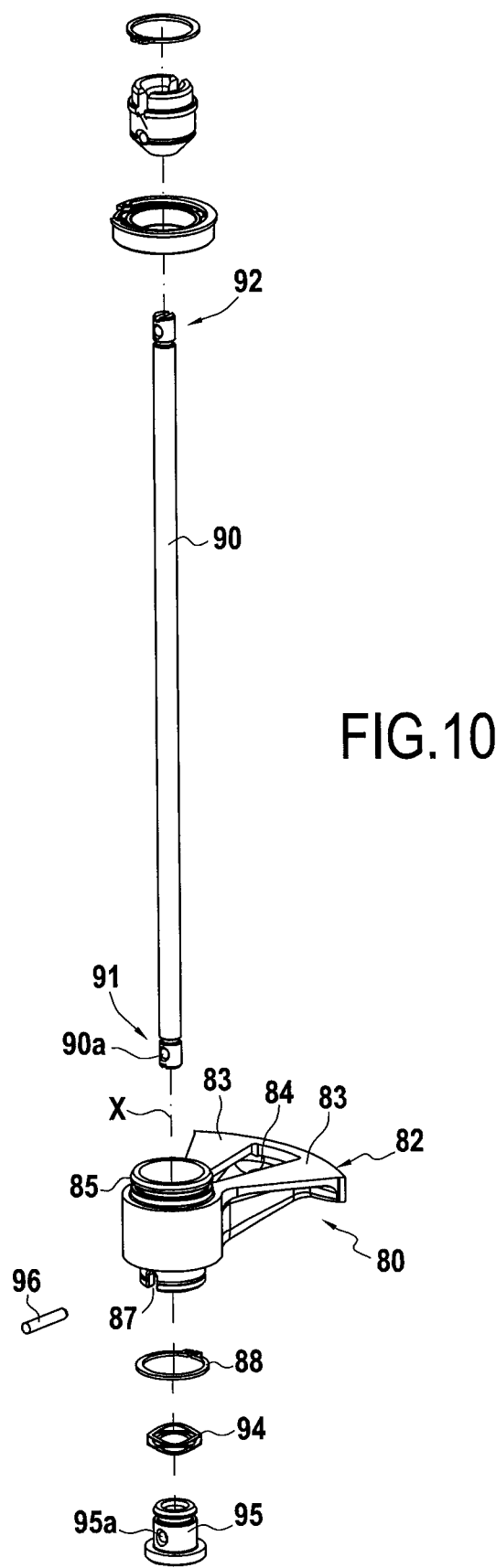
FIG. 10 is an exploded perspective view of a distributor and drive rod according to the embodiment of FIG. 3.

Furthermore, in reference to FIGS. 8 and 10, a rotary backwashing distributor (or "distributor") 80 is mounted to rotate with respect to the divider 70. The distributor 80 has a shutter 82 provided with a discharge opening 84 and is mounted so that said discharge opening 84 is periodically and selectively put into communication with each distribution column 72, whereby each distribution column 72 periodically and selectively establishes communication between the discharge opening 84 and respective ones of the passages 30 of the inner edges 24.

As mentioned above and as shown in FIG. 8, the rotary backwashing distributor 80 is rotatable with respect to the divider 70 and in direct contact with the divider 70. More precisely, the distributor 80 has an engagement portion 85 for engagement with a corresponding engagement portion 75 of the divider 70. The engagement portion 85 serves to center the distributor 80 relative to the divider 70.

In the embodiment shown, the shutter 82 is a plane portion of the distributor 80 having a well-defined angular extension related to the dimensions of the sectors and has a plane surface that is in sliding contact with the corresponding plane surface 77 defined by the end portion of the divider 70. Other shapes of the shutter 82 are also contemplated, such as a conical shape, as long as they correspond to the shape of the divider end surface to enable sliding contact therebetween.

Figure 9A:
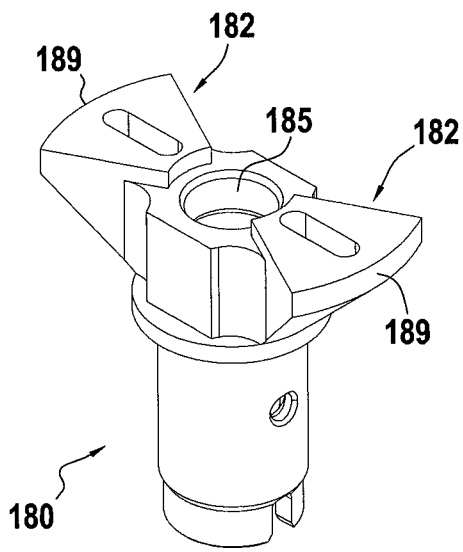
FIGS. 9A, 9B and 9C are perspective views of rotary backwashing distributors according to various embodiments.
Figure 9B:
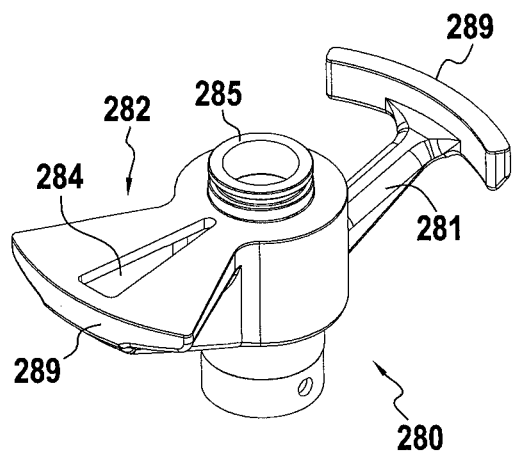
Figure 9C:
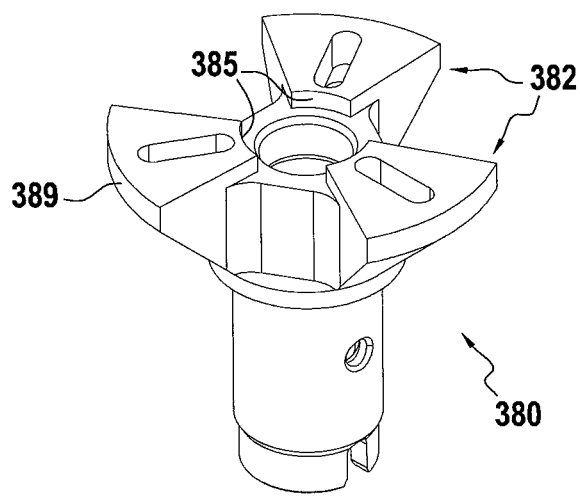

For instance, FIGS. 9A, 9B and 9C illustrate alternative embodiments of the rotary backwashing distributor. FIG. 9A shows a distributor 180 having a plurality of shutters, here two shutters 182. Each shutter 182 may be provided with a discharge opening. The distributor 180 has a central hole 185 serving as an engagement portion. In this embodiment, the divider may have a sleeve or protrusion featuring a corresponding engagement portion for engagement into the central hole 185.

FIG. 9B shows a distributor 280 having a shutter and a mass element 281. The mass element 281 balances the mass of the shutter, in particular to maintain sealing contact between the shutter and the divider 70.

FIG. 9C shows a distributor 380 having three shutters 382. The engagement portion 385 of the distributor 380 is formed by radially inner walls of the shutters 382. The inner walls of the shutters 382 are configured to match the shape of a corresponding engagement portion of the divider, e.g. a sleeve or protrusion.

As can be seen in FIG. 4, the first cover 50 is arranged such that the end portion of the divider 70 extends at least slightly into the axial opening 58 of the first cover, and the distributor 80 is provided within said axial opening 58. Thus, the shutter 82 is in contact with the divider 70 through the axial opening 58 of the first cover 50.

With the embodiments of FIGS. 9A, 9B and 9C, it is possible to axially center the distributor 180, 280, 380 through the contact between the first cover 50 and the outer diameter of the distributor 180, 280, 380. In this respect, the distributors 180, 280, 380 may respectively comprise outer diameter surfaces 189, 289, 389 configured to slidably contact the first cover 50, e.g. the inner shoulder 57. The respective outer diameter surfaces 189, 289, 389 may be formed as radially outer surfaces of the respective shutters 182, 282, 382 and/or as radially outer surfaces of other elements, such as the mass element 281 (see FIG. 9B).

If the centering of the distributor 180, 280, 380 with respect to the first cover 50 is performed through the outer diameter surfaces 189, 289, 389, there is possibly no need for the engagement portions 185, 285, 385.

As shown in FIG. 10, the shutter 82 comprises shutter zones 83 located on either sides of the discharge opening 84 of the distributor 80 that communicates with the distribution columns 72. The shutter zones 83 of the shutter 82 bear against the end surface 77 of the divider 70. In this example, the discharge opening 84 has an outline in the shape of a radial slot, but other opening shapes are also contemplated (see FIGS. 9A-9C), such as a disc sector, a substantially triangle shape (see the discharge opening 284 in FIG. 9B) or an elliptical shape.

When the discharge opening 84 passes from one sector to another, the two adjacent sectors are isolated by said shutter zones 83, so that the shutter 82 prevents fluid to be filtered from entering a distribution column 72 that is in communication with the discharge opening 84.

The rotary distributor 80 has an exhaust chamber 86 connected to the discharge opening 84. The exhaust chamber 86 of the distributor 80 is in permanent communication with an axial duct 76a defined within the cylindrical core 76 of the divider so that backwashing liquid can be removed from the filtering unit through the axial duct 76a and through the lateral ducts 69 of the second cover 60. Thus, the configuration of the distributor 80, the divider 70 and the second cover 60 prevents any mixing between the backwashing fluid and the fluid to be filtered.

Figure 12:
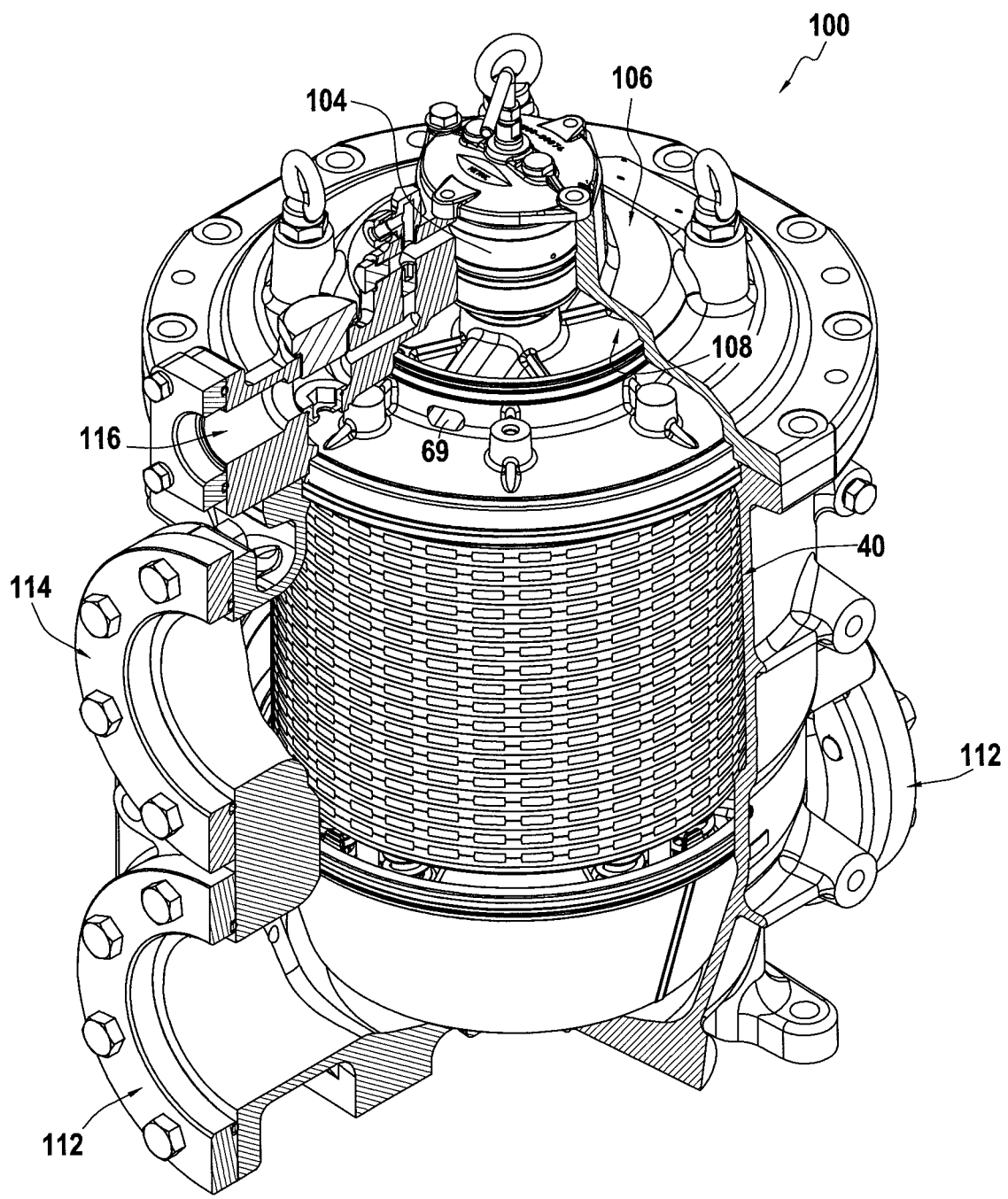
FIG. 12 is a cut perspective view of a filter comprising a filtering unit.

The axial duct 76a also houses a drive rod 90, said drive rod 90 thus extending axially through the divider 70 and the second cover 60. The drive rod 90 has a first end portion 91 rotationally fixed to the distributor 80 and a second end portion 92 configured to be driven in rotation. The second end portion 92 may be driven in rotation by a hydraulic motor 104, as shown in FIG. 12. Instead of the hydraulic motor 104, another drive source may be used, such as an electric motor or a pneumatic motor.

To ensure sealing contact between the divider 70 and the distributor 80, the filtering unit comprises biasing means 94 cooperating with the drive rod 90 so as to force the distributor 80 against the divider 70.

According to a first embodiment, illustrated in FIG. 10, the drive rod 90 is axially fixed to the second cover 60 and the biasing means 94 are mounted between the drive rod 90 and the distributor 80.

In this embodiment, the drive rod 90 is provided with a tip portion 95. Here, the tip portion 95 is a distinct part in which the drive rod 90 is engaged. However, the tip portion 95 and the drive rod 90 could be made of a single piece. The tip portion 95 is located at the first end portion 91 of the drive rod 90. The drive rod 90 and the tip 95 portion are integrally fastened by a pin 96 inserted in a through hole 95a of the tip portion 95 and a through hole 90a of the drive rod 90. Other fastening means could be used. The pin 96 radially extends beyond the tip portion 95 so as engage in a corresponding hole 87 of the distributor 80. Thus, the distributor 80 integrally rotates with the drive rod 90. Other means for rotationally fixing the distributor 80 and the drive rod 90 may be used. Besides, said hole 87 is shaped as a notch open at one of its axial ends. Biasing means 94, e.g. a spring, a corrugated washer or other suitable biasing means, are mounted between the tip portion 95 and the distributor 80 so as to force the distributor 80 away from the tip portion 95, i.e. towards the divider 70. A lock ring 88 secured around the distributor 80 prevents the pin 96 from going out of the respective holes 90a, 95a, 87 of the drive rod 90, the tip portion 95 and the distributor 80.

The second end portion 92 of the drive rod is rotatably mounted to the second cover 60, e.g. via a bearing. In this embodiment, the axial position of the second end portion 92 with respect to the second cover 60 is fixed.

Figure 11:
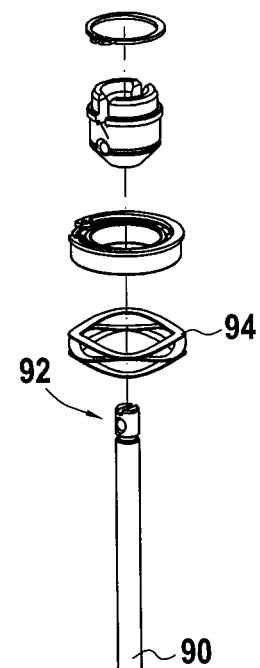
FIG. 11 is an exploded perspective view of a distributor and drive rod according to another embodiment.
Figure 11:
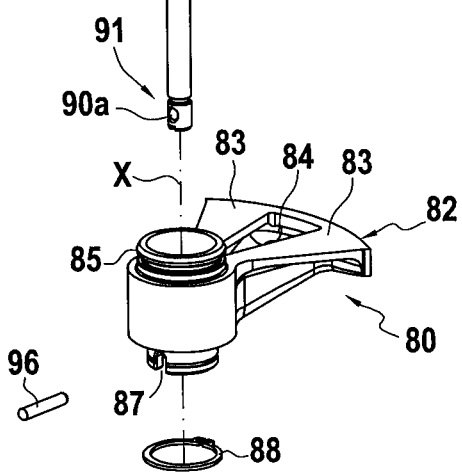

According to a second embodiment, illustrated in FIG. 11, the biasing means 94 are mounted between the drive rod 90 and the second cover 60. The drive rod 90 and distributor 80 substantially have the same configuration as above, except as regards the following. In order to force the distributor 80 towards the divider 70, biasing means 94, e.g. a spring in the form of a corrugated washer, are mounted between a bearing of the second end portion 92 of the drive rod 90 and the second cover 60, namely a shoulder 65 of the second cover 60 (see FIG. 7). Thus, the axial position of the second end portion 92 with respect to the second cover 60 may vary to match the axial length of the divider 70. As no biasing means are provided at the first end portion 91, a tip portion such as the above-described tip portion 95 is not necessary.

Besides, as shown in FIG. 4, the filtering unit according to the present embodiment further comprises a strainer 98 for retaining the most bulky residues.

A filter 100 is shown in perspective in FIG. 12. The filter 100 comprises a casing 110 and the above-described filtering unit 40 is housed within the casing 110.

The filter 100 comprises at least one inlet portion 112 and at least one outlet portion 114. In this embodiment, there are shown two inlet portions 112 that are fluidly connected to the passages 30 of the inner edges 24 of the filter elements 10, and two outlet portions 114 that are fluidly connected to the passages 32 of the outer edges 26.

The filter 100 further comprises a filter head 106 in which there is formed an outlet 116 for the backwash liquid. The filter head 106 also carries the motor 104 axially, which motor 104 is connected to one end of the drive rod 90 (the second end portion 92). The space 108 inside the filter head 106 is in communication with the lateral ducts 69 and the transfer chamber 68 of the second cover 60, and thus with the internal duct 76a defined in the core 76 of the divider 70. The lateral ducts 69 are configured to bring backwash liquid from the internal duct 76a to the space 108, where backwash liquid can then exit through the outlet 116. The connection between the hydraulic motor 104 and the drive rod 90 extends through the second cover 60 in sealed manner. The connection between a bearing of the second end portion 92 of the drive rod 90 and the second cover 60 is provided in a sealed manner too.

The liquid for cleaning is inserted via the inlet portions 112 of the casing 110, passes through the strainer 98, and penetrates into the distribution columns 72 (between the fins 74) that are not isolated by the backwashing distributor 80. The purified liquid is delivered to the outside of the filtering component and is removed by the outlet portions 114 of the casing 110. At the same time, the backwashing distributor 80 is driven to rotate slowly by the motor 104. The backwashing liquid is discharged from the discharged opening 84 and led to the outlet 116 for the backwash liquid by the above-described structure.

Figure 13:
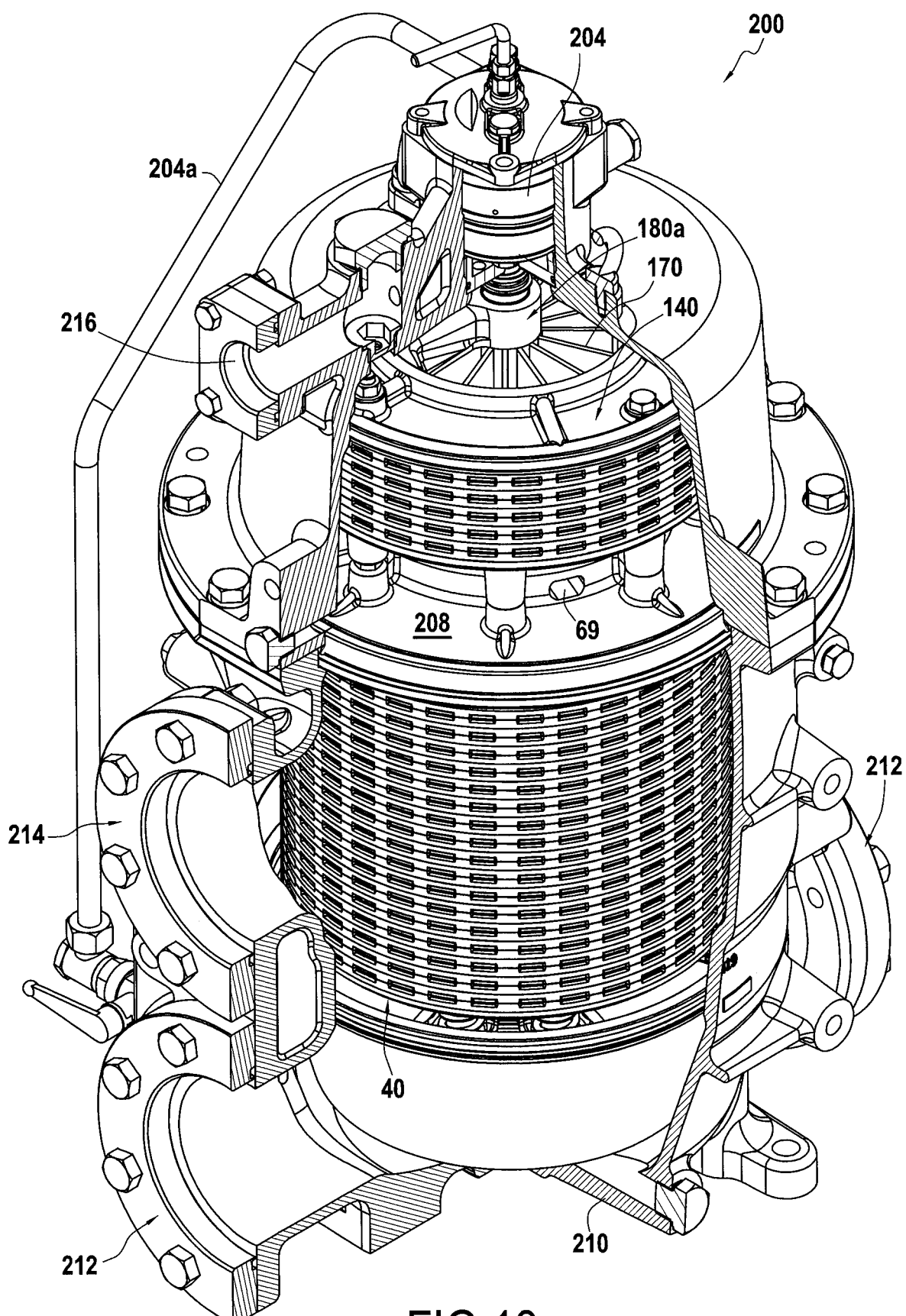
FIG. 13 is a cut perspective view of a filter comprising a main filtering unit and an auxiliary filtering unit, according to another embodiment.

FIG. 13 shows a filter 200 according to another embodiment. Elements similar or identical to the filter 100 are referenced by the same reference sign, irrespective of the hundreds digit, and description thereof will be omitted.

The filter 200 comprises a casing 210 having an inlet portion 212, an outlet portion 214 and an outlet for backwash fluid 216. The filter 200 comprises a main filtering unit 40 as described above, and an auxiliary filtering unit 140. The auxiliary filtering unit 140 generally has a smaller capacity and is arranged to receive the fluid that has been used for backwashing the sectors of the main filtering unit 40. This auxiliary filtering unit 140 thus receives the backwash fluid resulting from backwashing the main filtering unit 40. The backwash fluid may enter filter elements from the outside of the auxiliary filtering unit 140, i.e. the space 208 is in communication with the outside of the auxiliary filtering unit 140. Once this fluid has been filtered, it flows to the inside of the auxiliary filtering unit 140, is collected by the divider 170 (i.e. it flows upwards in the direction of FIG. 13) and sent to the outlet for backwash fluid 216.

The auxiliary filtering unit 140 may also be provided with an automatic backwashing system similar to that described above. In particular, as shown, the distributor 180a may be in direct contact with the divider 170. The filter 200 as shown comprises respective rotary distributors 80, 180a at each end of an assembly comprising the main filtering unit 40 and the auxiliary filtering unit 140. Both distributors 80, 180a are driven by the same axial rod or integrally rotating axial rods connected to the shaft of the hydraulic motor 204. As for the embodiment of FIG. 12, also not represented in FIG. 12, the hydraulic motor 204 may be driven by filtered fluid sent through a duct 204a.

Although the present invention has been described by referring to specific exemplary embodiments, modifications may be provided to these examples without the departing from the general scope of the invention as defined by the claims. In particular, individual characteristics of the different illustrated/mentioned embodiments may be combined in additional embodiments. Therefore, the description and the drawings should be considered in an illustrative rather than in a restrictive sense.

The invention claimed is:

1. A filtering unit comprising:
a filtering component having an inner wall, an outer wall arranged around the inner wall so as to define an inner space between the inner wall and the outer wall, and a filtering mesh partitioning the inner space into a pre-filter chamber and a post-filter chamber, at least said pre-filter chamber being circumferentially compartmented in sectors, at least one of said inner wall and outer wall having passages respectively communicating with corresponding ones of the sectors;
a divider arranged coaxially with the filtering component and inside a cylindrical space defined by the inner wall of the filtering component, the divider having a plurality of fins distributed circumferentially which are in contact with the inner wall of the filtering component and define distinct distribution columns communicating with said passages; and
a rotary backwashing distributor having a shutter provided with a discharge opening, the rotary backwashing distributor being mounted to rotate so that said discharge opening is periodically and selectively put into communication with each distribution column, whereby each distribution column periodically and selectively establishes communication between the discharge opening and respective ones of the passages,
wherein the rotary backwashing distributor is in direct contact with the divider, and the shutter of the rotary backwashing distributor is in direct contact with end surfaces of the plurality of fins of the divider.

2. The filtering unit as claimed in claim 1, further comprising a drive rod extending axially through the divider, the drive rod having a first end portion rotationally fixed to the rotary backwashing distributor and a second end portion configured to be driven in rotation.

3. The filtering unit as claimed in claim 2, further comprising biasing means cooperating with the drive rod so as to force the rotary backwashing distributor and the divider against each other.

4. The filtering unit as claimed in claim 3, wherein the second end portion of the drive rod is axially fixed with respect to the divider and the biasing means are mounted between the first end portion of the drive rod and the rotary backwashing distributor.

5. The filtering unit as claimed in claim 3, wherein the biasing means are mounted between the second end portion of the drive rod and the divider.

6. The filtering unit as claimed in claim 1, wherein the shutter is in direct contact with the divider.

7. The filtering unit as claimed in claim 1, further comprising a first cover and a second cover located at either sides of the filter component in the axial direction, wherein the first cover has an annular shoulder having an internal surface defining an axial opening and the shutter is in contact with the divider through the axial opening.

8. The filtering unit as claimed in claim 7, wherein an inner diameter of the shoulder of the first cover is equal to or greater than an outer diameter of the divider.

9. The filtering unit as claimed in claim 7, wherein the divider and the second cover are rigidly attached to each other.

10. The filtering unit as claimed in claim 1, wherein the rotary backwashing distributor comprises an engagement portion for engagement with a corresponding engagement portion of the divider.

11. The filtering unit as claimed in claim 1, wherein the divider is made of a single piece.

12. A filter comprising:
a casing;
the filtering unit as claimed in claim 1 housed within the casing; and at least one inlet portion and at least one outlet portion, at least one of said at least one inlet portion and said at least one outlet portion being fluidly connected to said passages.

13. A filter comprising:
a main filtering unit; and
an auxiliary filtering unit,
wherein each of the main filtering unit and the auxiliary filtering unit comprises the filtering unit as claimed in claim 1, and
wherein the auxiliary filtering unit is arranged to receive backwash fluid used for backwashing the main filtering unit.

14. The filtering unit as claimed in claim 2, wherein the shutter is in direct contact with the divider.

15. The filtering unit as claimed in claim 3, wherein the shutter is in direct contact with the divider.

16. The filtering unit as claimed in claim 4, wherein the shutter is in direct contact with the divider.

17. The filtering unit as claimed in claim 5, wherein the shutter is in direct contact with the divider.

18. The filtering unit as claimed in claim 2, comprising a first cover and a second cover located at either sides of the filter component in the axial direction, wherein the first cover has an annular shoulder having an internal surface defining an axial opening and the shutter is in contact with the divider through the axial opening.

19. The filtering unit as claimed in claim 3, comprising a first cover and a second cover located at either sides of the filter component in the axial direction, wherein the first cover has an annular shoulder having an internal surface defining an axial opening and the shutter is in contact with the divider through the axial opening.

20. The filtering unit as claimed in claim 4, comprising a first cover and a second cover located at either sides of the filter component in the axial direction, wherein the first cover has an annular shoulder having an internal surface defining an axial opening and the shutter is in contact with the divider through the axial opening.

* * * * *